March 22, 1966 W. G. MOEHLENPAH ETAL 3,241,424
CONNECTOR PLATES WITH RIGID TOOTH STRUCTURE
Filed Dec. 5, 1963 2 Sheets-Sheet 1
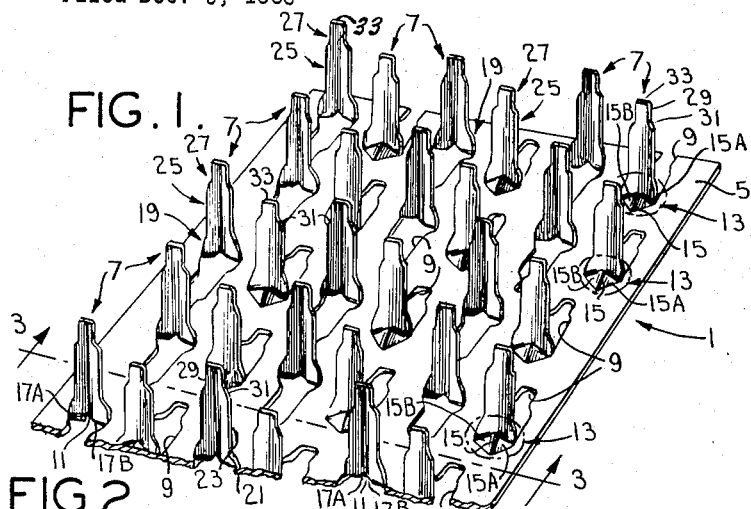
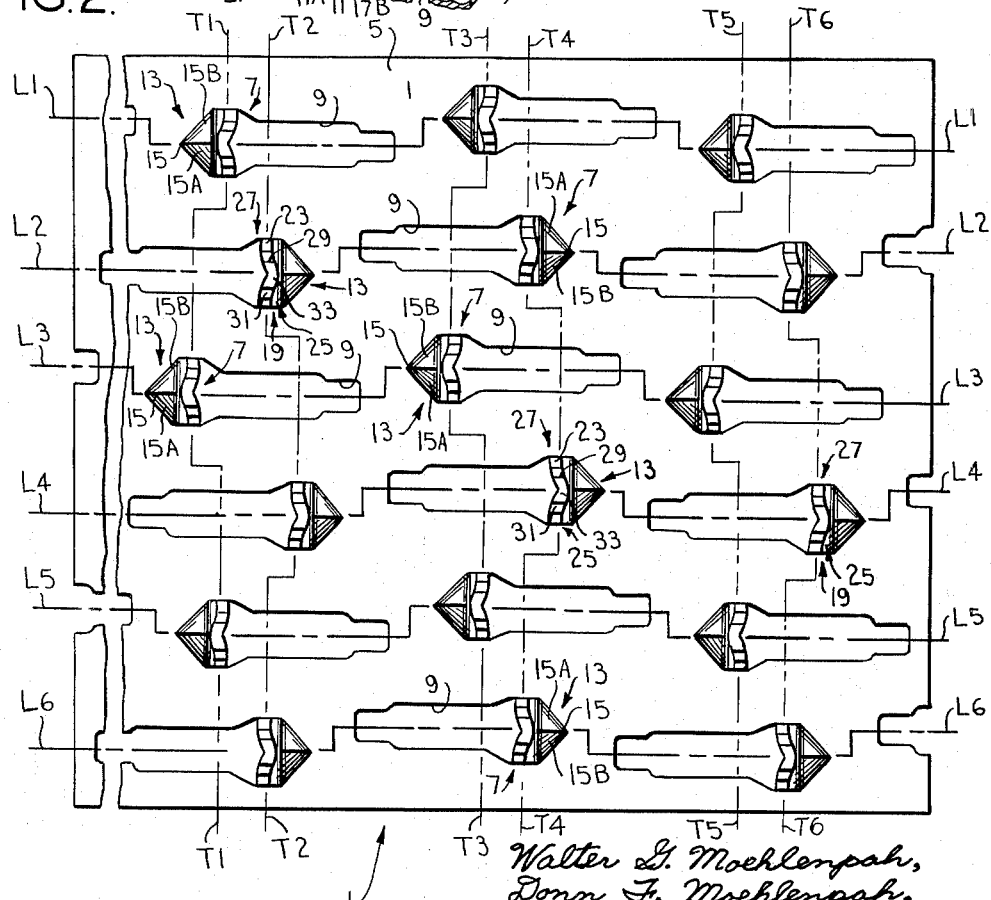
Walter G. Moehlenpah,
Donn F. Moehlenpah,
Inventors.

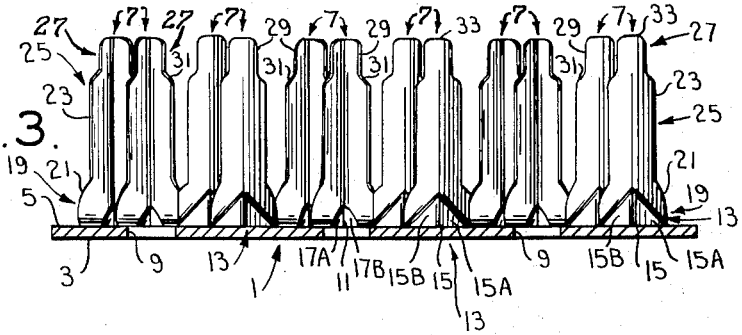
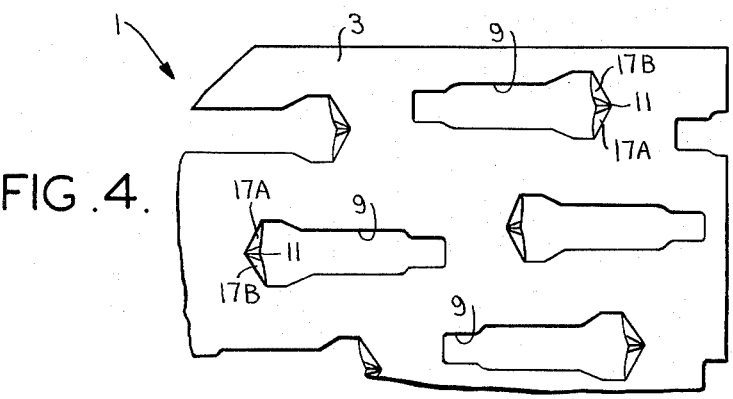
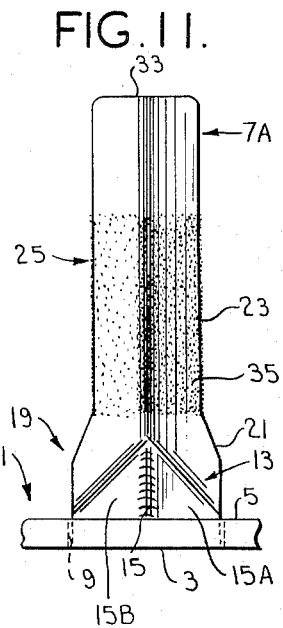
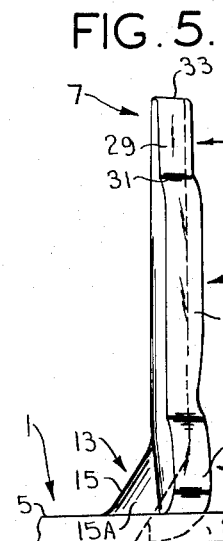
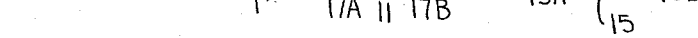

United States Patent Office 3,241,424
Patented Mar. 22, 1966

3,241,424
CONNECTOR PLATES WITH RIGID TOOTH STRUCTURE
Walter G. Moehlenpah, Ladue, Mo., and Donn F. Moehlenpah, Winona, Minn., assignors to Hydro-Air Engineering, Inc., St. Louis, Mo.
Filed Dec. 5, 1963, Ser. No. 328,289
9 Claims. (Cl. 85—13)

This invention relates to connector plates, and more particularly to metal connector plates having a plurality of teeth projecting therefrom for securing together adjacent wood structural members.

Metal connector plates having a number of teeth struck out from the plate so as to extend generally perpendicularly from the plate have long been used to secure together adjacent and abutting wood structural members to form joints and the like. The teeth of these plates must be strong enough to withstand the forces necessary to drive or force them into the wood without bending and collapsing, and when embedded in the wood the teeth must serve to hold the adjacent wood members firmly together under the substantial tension, compression, shear and torsion forces to which the joint is subjected. That is, the teeth must have a maximum strength (referred to as allowable load per tooth, or allowable tooth value or rating) to withstand joint loading which tends to move the teeth through the wood in a direction parallel to the connector plate surface. This tooth value is based on either the yield or the ultimate strength of a wood joint secured together by the metal connector plates, whichever is less. The yield strength is the maximum amount of tension a connected wood joint of two end-to-end abutted members will withstand before the abutting members separate by a fixed small distance, e.g., .015″. The pounds of such tensile stress per plate so withstood, divided by the number of teeth in the plate and a constant (e.g., 1.7), is defined as the acceptable allowable design yield value per tooth (referred to hereinafter as the yield value). The ultimate strength is the maximum amount of tension the joint can withstand before the joint completely fails. The pounds of such tensile stress so withstood divided by the number of teeth and a second constant (e.g., 3) is defined as the acceptable allowable design ultimate value per tooth (referred to hereinafter as the ultimate value). A plate that has teeth with a yield value substantially greater or less than the ultimate value is less efficient and economical than one in which these values are substantially equal or balanced. Also, the teeth must not cause significant splitting of the wood and thereby weaken the joint. The problems of providing connector plates which satisfy all of these requirements are greatly aggravated by the recent trend toward using thinner metal stock, such as 18 ga. steel, to fabricate these plates. As a result, connector plates of previously known designs fail to meet all of these criteria.

Accordingly, among the several objects of this invention may be noted the provision of metal connector plates which have teeth with an increased stiffness and resistance to bending and which may be forced or driven into wood to form joints without bending or collapsing; the provision of such plates which form wood joints able to withstand high tension, compression, shear and torsion stresses; the provision of connector plates of the class described that have a high tooth value or rating; the provision of connector plates in which the ultimate and yield values are substantially balanced; the provision of such connector plates which may be forced into wood with no significant splitting and weakening of the wood; and the provision of connector plates which may be made economically from thinner gage metal stock. Other objects and features of the invention will be in part apparent and in part pointed out hereinafter.

Briefly, the present invention is directed to a connector for securing together adjacent wood structural members which comprises a metal plate having a plurality of elongate teeth which extend perpendicularly from one face of the plate. Each of the teeth is integrally formed from the plate, i.e., it is constituted by a struck-out portion of the plate, thereby vacating an elongate slot in the plate with each tooth projecting from one face of the plate at one end of its respective slot. Each of these teeth has a portion adjacent its juncture with the plate which is bulged outwardly in a direction away from the vacated slot generally on a line inclined in relation to the plate thereby providing a gusset having sides diverging from this line to stiffen the tooth and reinforce it against bending. The gusset is a folded transition section having a pair of sides merging substantially centrally of the width of the tooth to form a rib inclined with respect to the plate. The angle of inclination of this rib is preferably at least 45°, e.g. 60°, with respect to the plate. Preferably the base portion of the tooth which includes the gusset is wider than the shank portion of the tooth, and the nose or tip portion of the tooth is narrower than the shank, the lateral edges of the base portion converging to from a first pair of shoulders as this portion merges into the shank portion. The lateral edges of the shank portion preferably taper slightly toward a second, but narrower, pair of shoulders at the juncture between the shank and tip portions of the tooth. Each of the teeth is preferably generally V-shaped in cross section with each tooth having a generally continuous V-groove which flows from the opposite surface of the plate throughout the lengths of the base and shank portions and also preferably the tip portion. The arrangement or pattern of the teeth on the plate is also of significance, preferably being arranged in parallel transverse and longitudinal rows with teeth in adjacent rows facing in opposite directions and with adjacent teeth in each row being respectively longitudinally and laterally staggered, thereby to minimize splitting.

The invention accordingly comprises the constructions hereinafter described, the scope of the invention being indicated in the following claims.

In the accompanying drawings, in which two of various possible embodiments of the invention are illustrated, FIG. 1 is a fragmentary perspective view of a connector plate embodying our new design;

FIG. 2 is a plan view of the toothed side thereof with one end broken away to indicate indeterminate length;

FIG. 3 is an enlarged sectional view taken on line 3—3 of FIG. 1;

FIG. 4 is a fragmentary plan view of the untoothed side of this plate on an enlarged scale;

FIG. 5 is a side elevational view on an enlarged scale of one of the teeth of the connector plate of FIG. 1;

FIG. 6 is an end elevational view on an enlarged scale of the tooth shown in FIG. 5;

FIG. 7 is a sectional view taken along line 7—7 of FIG. 6;

FIG. 8 is a sectional view taken along line 8—8 of FIG. 6;

FIG. 9 is a sectional view taken along line 9—9 of FIG. 6;

FIG. 10 is a sectional view taken along line 10—10 of FIG. 6; and

FIG. 11 is an enlarged fragmentary elevational view of a modified tooth of another embodiment of this invention.

Corresponding reference characters indicate corresponding parts throughout the several views of the drawings.

Referring now to the drawings, the connector plate of the present invention comprises a metal plate, indicated generally by reference numeral 1, having an outer face 3 and an inner face 5. Elongate teeth, indicated generally at 7, are struck or punched from plate 1 and extend in a direction generally perpendicular to faces 3 and 5 of plate 1, each tooth leaving an elongate vacated opening or slot 9 which generally conforms to the tooth shape. Teeth 7 are struck from plate 1 so as to be arranged in successive series of generally parallel longitudinally extending rows indicated by phantom lines L1–L6, and generally parallel transverse rows T1–T6. The teeth 7 in any pair of adjacent rows face in opposite directions. Adjacent teeth 7 in each longitudinal row are slightly alternately offset or staggered transversely one from the other. Similarly, adjacent teeth 7 in each transverse row are slightly alternately offset or staggered longitudinally.

As each tooth 7 is of a substantially identical configuration, a detailed description of one tooth will suffice. Adjacent its juncture with plate 1, tooth 7 is bulged outwardly in a direction away from slot 9 generally on a line 11 inclined with respect to the plate faces 3 and 5, thus forming a generally bowed gusset generally indicated at 13. This gusset 13 comprises a folded transition portion in which the sides merge substantially centrally of the width to form a ridge or rib 15 inclined with respect to the tooth. The surfaces of gusset 13 formed from the outer plate surface 3, and indicated at 17A and 17B, diverge from line 11 thereby forming a generally V-shaped groove opening in a direction toward slot 9. The faces of gusset 13, formed from inside plate face 5 and indicated at 15A and 15B, form a bowed, convex or folded diamond-shaped transition portion, as more specifically illustrated in the circled portion at numeral 13 in FIG. 1. The configuration of gusset 13 is shown to advantage by the cross-sectional view in FIG. 7. The angle of inclination of rib 15 and line 11 relative to the plate is at least 35° and preferably 60° or a somewhat greater angle.

The body portion of the tooth comprises a base or root portion indicated generally at 19 and a shank portion 25. The base portion, which includes gusset 13, has lateral or side edges 21 which converge to form lateral edges 23 of shank portion 25 of the tooth, and thereby form a first pair of shoulders 22. The width of tooth shank 25 is considerably narrower than the width of base portion 19 at its juncture with the plate and sides 23 taper from the juncture of base 19 and shank 25 toward the projecting or distal end of the tooth. This slight positive taper in the order of one or two degrees provides maximum resistance to withdrawal or pull-out. It will also be noted that the sides 21 and 23, when viewed in cross section (FIGS. 7–9) converge in a direction toward slot 9. A tip or nose portion 27, of narrower width than shank 25, has substantially parallel sides 29 when viewed in elevation (FIG. 6). A second pair of shoulders 31 is provided at the juncture of the shank and tip portions of the tooth. The projecting end 33 of tip portion 27 is generally flat and blunt. The length of the tip portion is preferably about 1/6 to 1/4 of the total length of the tooth 7 and the width of this tip portion 27 is preferably about 1/2 to 2/3 the width of the shank portion.

Tooth 7 is crimped along its medial longitudinal axis, whereby the tooth has a generally V-shaped cross section throughout the lengths of the shank and tip portions which merges with the V-shaped groove of the base portion, thus forming a generally V-shaped groove which flows continuously from outer plate face 3 to the projecting end 33 of tip 27. Thus tooth 7 is concave on its face toward slot 9 and convex on the other face. The included angle of the V-groove formed by the crimped surfaces of tooth 7 facing slot 9 is approximately 135° throughout the shank and tip portions. This angle may be more or less than 135°, e.g., it may be decreased to 105°–90° or increased somewhat over 135°. The opposite surface of tooth 9 is arcuate as shown in FIGS. 7–10.

Connector plates 1 of the present invention are particularly useful in forming strong reliable joints between adjacent wood members such as are used in fabricating various wooden structures (e.g., trusses, box beams, wall panels, boxes and pallets) preferably by positioning two plates on opposite sides of the wood members to be joined, each spanning or bridging the area of contact between the members, and then pressing the plates so that the teeth 7 are entirely embedded in the wood and inner faces 5 of the plates are in contact with the wood surfaces. The gusset portion 13 and the continuous longitudinal V-groove throughout the length of each tooth 7 stiffens and reinforces the teeth so that as the plates are forced against the wood the teeth will not bend and collapse. The generally flat blunt projecting end 33 cuts through the wood fibers rather than spreading them apart which would aggravate splitting of the wood. As the nose or tip portion of each tooth is much narrower than the shank and base portions, the teeth tips are rather easily forced into the wood for initial penetration. This anchors or fixes the teeth ends in the wood and as the base or root portion of each tooth is also firmly fixed relative to the plate, each tooth acts as a very rigid column thereby preventing bending and collapsing of the teeth as the plate is forced further into the wood. The columnar strength of the teeth is so great that the teeth can be pressed into even hard knots without collapsing or bending over. The broadened tooth base 19 provides an increased contact area with the wood, thereby increasing the shear strength of the tooth and providing additional resistance to compression failure in the wood fibers. The enhanced stiffness and rigidity of the teeth 7, which prevents bending or collapsing of the teeth as they are pressed into the wood, also functions, when the teeth are fully embedded in the wood, to transfer the load deeper into the wood and distribute it along substantially the entire surfaces of the teeth 7. The tapering sides 23 of shank portion 25 provide an improved resistance to any tooth withdrawal or pull-out forces. The staggered or offset pattern of the teeth in longitudinal rows L1–L6 and T1–T6 allows maximum utilization of the metal area of the plate while reducing any splitting tendencies. As half the teeth face in one direction and the other half face in the opposite direction, maximum resistance is provided against stress being applied in either direction.

Exemplary plates 1 of this invention (fabricated from 18 ga. galvanized steel having teeth 11/16 long with a longitudinal tooth spacing module of 1″ and a transverse tooth separation module of 11/32″ with 1/8″ offsets between adjacent teeth in each transverse row and 3/32″ offsets between adjacent teeth in each longitudinal row) have an ultimate value and a yield value each of approximately 70 pounds per tooth when tested in fir. Thus the tooth value or rating is 70 pounds, which exceeds the ratings of many commercial plates of different tooth configurations fabricated from 14 ga. and 16 ga. steel. Another advantage of these connector plates is that they may be used with other harder and softer woods, such as hemlock and pine, with substantially the same desirable results.

The plates of this invention may be economically fabricated from coil steel with a punch press using a progressive through-feed die. The crimping of the tooth effects stretch-forming by the die so that the material is work-hardened as the tooth is formed, thereby further enhancing the toughness and providing maximum tooth stiffness.

An alternate embodiment of the connector plates of the present invention is illustrated by a tooth 7A of FIG.

11, it being understood that a plurality of these teeth would be similarly formed to project from a plate and be formed integrally therefrom. Tooth 7A is identical to tooth 7 except that the shank portion extends all the way to the projecting end of the tooth thereby eliminating the necked-down tip portion and the second pair of shoulders. Also, a coating 35 of a protective and adhesive cement (such as synthetic polymeric resins of the epoxy base and other types) is applied to a portion of the surfaces of tooth 7A. This optional coating further improves the tooth withdrawal resistance. It is preferred that only a portion of the tooth be coated as generally the coating of the entire tooth surface increases the frictional resistance, during pressing operations, beyond desirable limits.

It will be understood that the teeth may be arranged in different patterns and that teeth of different designs can be interposed in the pattern of teeth of the configuration described. Also, if desired for blind connections, plates of this invention may include teeth projecting from the opposite sides of the plate. It will also be understood that the lengths of and widths of the teeth may be varied somewhat from that shown. For example, the length of the teeth can be reduced to about ½" or increased to about 1". The width may also be varied, but it is preferred that the width of the tip portion 27 be at least about 1¼ times the thickness of the plate and that the width of the shank portion 25 be at least about 1¾ times the thickness of the plate.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector for securing together adjacent wood structural members comprising a metal plate having a plurality of elongate integral teeth extending generally perpendicularly from one face thereof, each of said teeth being constituted by a struck-out portion of the plate vacating an elongate slot in the plate with each said tooth projecting from said one face of the plate at one end of its respective slot in the plate, each of said teeth having a base portion and a shank portion extending from the base portion, said base and shank portions being generally V-shaped in cross section substantially throughout their lengths and concave on the face of the tooth toward the respective slot and convex on the other face, the base portion of each tooth having an integral bowed gusset, said gusset having sides disposed at an angle with respect to each other and to the shank portion and meeting at a ridge generally in the central plane of the tooth, said ridge being inclined at an acute angle with respect to the plate and merging with the convex face of the tooth generally in said central plane at a point proximate the juncture of the base and shank portions, said base portion having a greater width than that of the shank portion, the lateral edges of the base portion converging to form the lateral edges of the shank portion thereby to form a first pair of shoulders, each of said teeth having a tip portion of lesser width than said shank portion with a second pair of sholders at the juncture of the tip and shank portions.

2. A connector as set forth in claim 1 in which the length of said shank portion is greater than the length of said base portion including the shoulders thereof.

3. A connector as defined in claim 1 in which the angle of inclination of the ridge with respect to the plate is not less than approximately 35°.

4. A connector as defined in claim 3 in which each of the said teeth is generally V-shaped in cross section in each portion thereof and each tooth has a generally continuous V-groove which flows from the other face of the plate throughout the lengths of the base, shank and tip portions.

5. A connector as defined in claim 3 in which the lateral sides of the shank portion taper from a first width at the first pair of shoulders to a lesser width at the second pair of shoulders, and the tip portion has lateral edges that are substantiallly parallel.

6. A connector as defined in claim 3 in which the teeth are arrayed in a plurality of generally parallel longitudinal rows and generally parallel transverse rows, the teeth in each adjacent longitudinal row facing in opposite directions, and the adjacent teeth in each longitudinal and transverse row being respectively transversely and longitudinally staggered thereby to minimize splitting of the wood structural members.

7. A connector as defined in claim 3 in which the length of the tip portion is between about ⅛ to ¼ the total length of the tooth.

8. A connector as defined in claim 3 in which the width of the tip portion is between approximately ½ to ⅔ the width of the shank portion.

9. A connector as defined in claim 5 in which the projecting end of the tip portion is generally flat and blunt to reduce splitting of the wood, whereby as the teeth are initially forced into the wood each tooth acts as a rigid column with its tip firmly anchored in the wood and its base firmly anchored to the plate thereby preventing bending and collapsing of the teeth as the plate is forced further into the wood.

References Cited by the Examiner

UNITED STATES PATENTS

| 780,744 | 1/1905 | Dix | 85—10 |
| 1,029,574 | 6/1912 | Bell | 85—10 |
| 1,970,335 | 8/1934 | Place | 85—16 |
| 3,016,586 | 1/1962 | Atkins | 85—13 |
| 3,052,149 | 9/1962 | West | 85—13 |
| 3,090,088 | 5/1963 | Foley et al. | 85—13 |
| 3,104,429 | 9/1963 | Sandford | 85—13 |

FOREIGN PATENTS

| 813,449 | 9/1951 | Germany. |

CARL W. TOMLIN, *Primary Examiner.*

M. HENSON WOOD, Jr., EDWARD C. ALLEN,
*Examiners.*